United States Patent [19]
Patrikios

[11] Patent Number: 5,921,457
[45] Date of Patent: Jul. 13, 1999

[54] ULTRASONIC WELDER INCLUDING ANVIL WITH ANGLED SIDEWALLS

[75] Inventor: Michael Patrikios, Stratford, Conn.

[73] Assignee: American Technolgy, Inc., Shelton, Conn.

[21] Appl. No.: 08/938,256

[22] Filed: Sep. 26, 1997

Related U.S. Application Data

[63] Continuation of application No. 08/621,089, Mar. 22, 1996, Pat. No. 5,772,100.

[51] Int. Cl.$^6$ .................................................... B23K 20/10
[52] U.S. Cl. ............................................. 228/1.1; 228/44.3
[58] Field of Search .................................... 228/1.1, 44.3, 228/110.1, 212; 156/73.1, 73.2, 580.2; 310/323; 29/868, 871

[56] References Cited

U.S. PATENT DOCUMENTS

| | | | |
|---|---|---|---|
| 3,943,608 | 3/1976 | Farkas | 24/16 PB |
| 4,529,473 | 7/1985 | Mims | 156/580.2 |
| 4,869,419 | 9/1989 | Nuss | 228/1.1 |
| 5,012,636 | 5/1991 | Hallam et al. | 57/204 |
| 5,318,603 | 6/1994 | Scheider et al. | 51/293 |

*Primary Examiner*—Samuel M. Heinrich
*Attorney, Agent, or Firm*—St. Onge Steward Johnston & Reens LLC

[57] ABSTRACT

An ultrasonic welder is provided which comprises a base, a transducer, a tip, an anvil, a gathering tool, and an actuator for moving both the anvil and gathering tool. The anvil has angled sidewalls to improve weld efficiency.

16 Claims, 8 Drawing Sheets

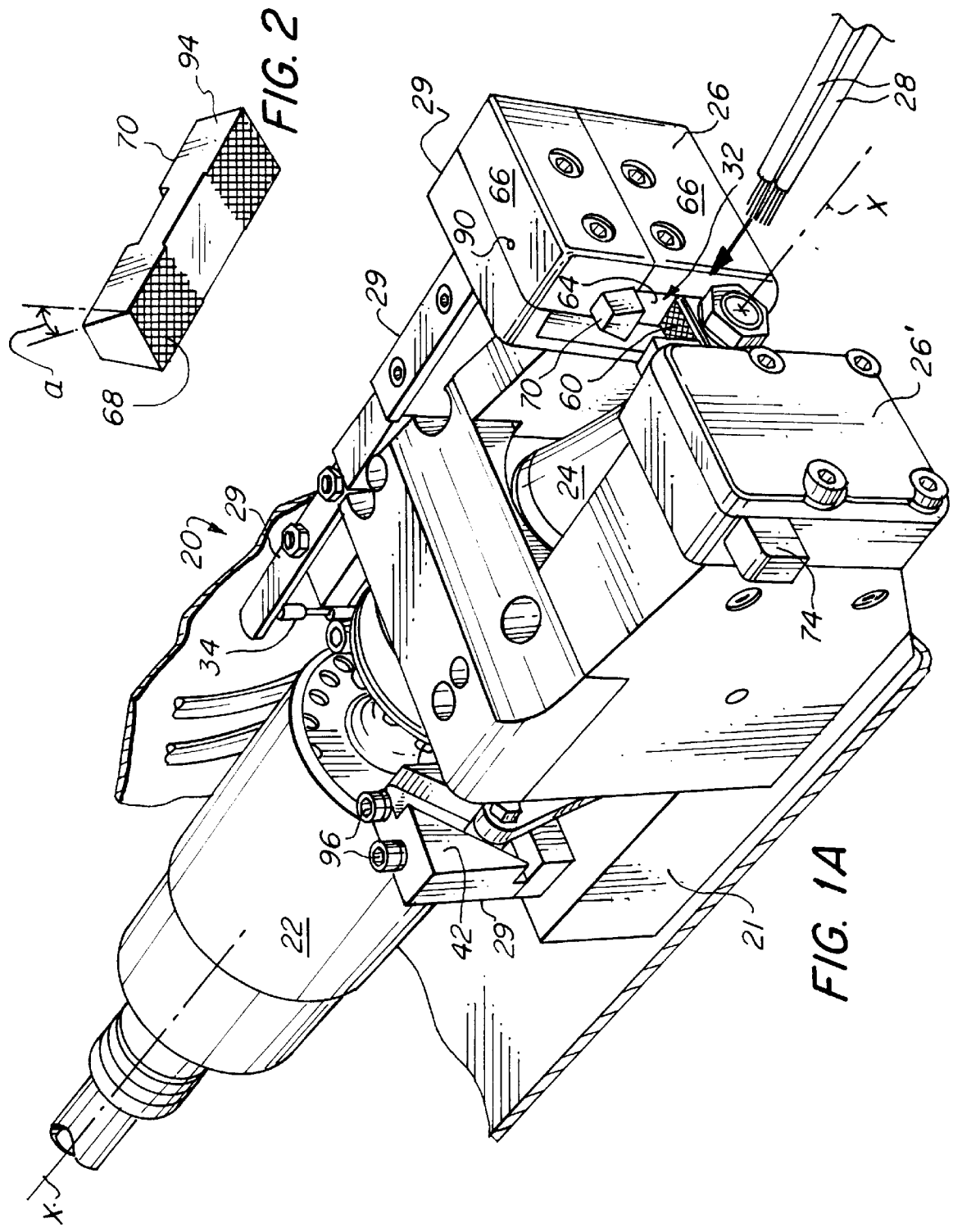

ULTRASONIC WELDER INCLUDING ANVIL WITH ANGLED SIDEWALLS

"This is a continuation of application Ser. No. 08/621,089 filed on Mar. 22, 1996, now U.S. Pat. No. 5,772,100."

FIELD OF THE INVENTION

The invention relates to ultrasonic welders and more particularly to ultrasonic welders automated to recognize and properly weld variable size and type articles with less energy than previously possible.

BACKGROUND OF THE INVENTION

Ultrasonic welders are known in the art. Known welders suffer several deficiencies in use. First, they are typically not capable of automatically calibrating either the physical or electrical weld parameters. Second, they do not very efficiently convert ultrasonic energy to weld energy.

Prior devices typically require manual calibration for each different weld zone size and material to be welded. This manual calibration must be repeated each time it is desired to weld either a different amount of material or a different material. For example, in ultrasonic welding of copper wire, changing to wire of different gauge will require recalibration of the welder. Calibration requires adjustment of not only physical parameters such as the positions of support, anvil and gathering tool as disclosed in U.S. Pat. No. 4,867,370, but also electrical parameters such as weld time.

Manual calibration makes operating ultrasonic welders expensive and disadvantageously reduces their usefulness in manufacturing environments either where multiple welds of varying size or material need to be made on a single product or subassembly, or where there are frequent line changes of products to be welded.

More recent ultrasonic welders have also been equipped with error detection features which confirm whether a particular weld matches the current calibration for the machine. These devices, however, are not capable of automatic recalibration when a mismatch is detected.

It is known to be desirable in ultrasonic welders to tune the horn to the transducer and to mount the horn coaxially with the transducer for maximum efficiency. It is also generally known that the horn must be supported, preferably at its nodal point, in order to prevent loading of the tip by the anvil from deflecting the horn off the transducer axis. In prior welders, the horn is typically rigidly mounted by set screws on its nodal point while at rest.

With such mounting systems it is often disadvantageously difficult to accurately align the horn on the transducer axis. More importantly, however, when the horn is in use its nodal point shifts with the longitudinal vibrations so that prior rigid mounts are rarely located at the nodal point with the horn in use and thus disadvantageously absorb significant energy, reducing the amount transmitted to the weld.

What is desired, therefore, is an ultrasonic welder capable of automatically recognizing and welding variable size and type articles. An ultrasonic welder with a dynamic horn mount which absorbs less, and thereby transmits more transducer energy to the weld, is also desired.

SUMMARY OF THE INVENTION

Accordingly, it is an object of the invention to provide an ultrasonic welder including means for recognizing and automatically adjusting for variable weld zone size and material.

Another object of the invention is to provide an ultrasonic welder including means for dynamically supporting the horn at its nodal point to provide consistent quality welds with less energy.

Yet another object of the invention is to provide an ultrasonic welder of the above character which includes a single actuator for adjusting a position of the gathering tool and anvil.

Still another object of the invention is to provide an ultrasonic welder of the above character which includes means for determining weld zone size from a state of the single actuator.

Still another object of the invention is to provide an ultrasonic welder of the above character which includes means for monitoring the amount of energy used for the weld.

Still a further object of the invention is to provide an ultrasonic welder of the above character which includes a nodal point collar for supporting the horn.

Yet a further object of the invention is to provide an ultrasonic welder of the above character which includes a spring mount for the collar permitting it to remain at the nodal point during horn use.

These and other objects of the invention are achieved by provision of an ultrasonic welder comprising a base, a transducer, a tip, an anvil, a gathering tool, and an actuator for moving both the anvil and gathering tool to define a weld zone. An encoder reads movement of the actuator and a microprocessor determines weld zone size to control the transducer for maximizing weld efficiency.

Preferably, the gathering tool is moved by a cam and crank arm. Preferably, the actuator comprises a cylinder and piston and a movable frame mounted thereto.

Preferably, a horn is mounted between the transducer and tip and the horn is dynamically mounted along an axis of the transducer to transmit the maximum amount of ultrasonic energy to the weld. The dynamic mount preferably comprises a spring mounted collar having an inner rim adjacent a nodal point of the horn.

In another aspect, the invention relates to a method of operating an ultrasonic welder to automatically recognize and reliably weld varying weld zone sizes. The method comprises the steps of applying an ultrasonic burst sufficient to settle but not weld the articles, determining a welding size of the weld zone, and applying sufficient ultrasonic energy to weld the articles within time and amplitude quality limits. The compression burst is preferably selected by determining a compression size of the weld zone and then referencing a database.

The invention and its particular features and advantages will become more apparent from the following detailed description considered with reference to the accompanying drawings.

BRIEF DESCRIPTION OF THE DRAWINGS

FIG. 1A is a front isometric view of an ultrasonic welder in accordance with the invention prior to insertion of articles to be welded.

FIG. 2 is a bottom isometric view of an anvil for use with the ultrasonic welder of FIG. 1.

DETAILED DESCRIPTION OF THE INVENTION

Figure 1B:
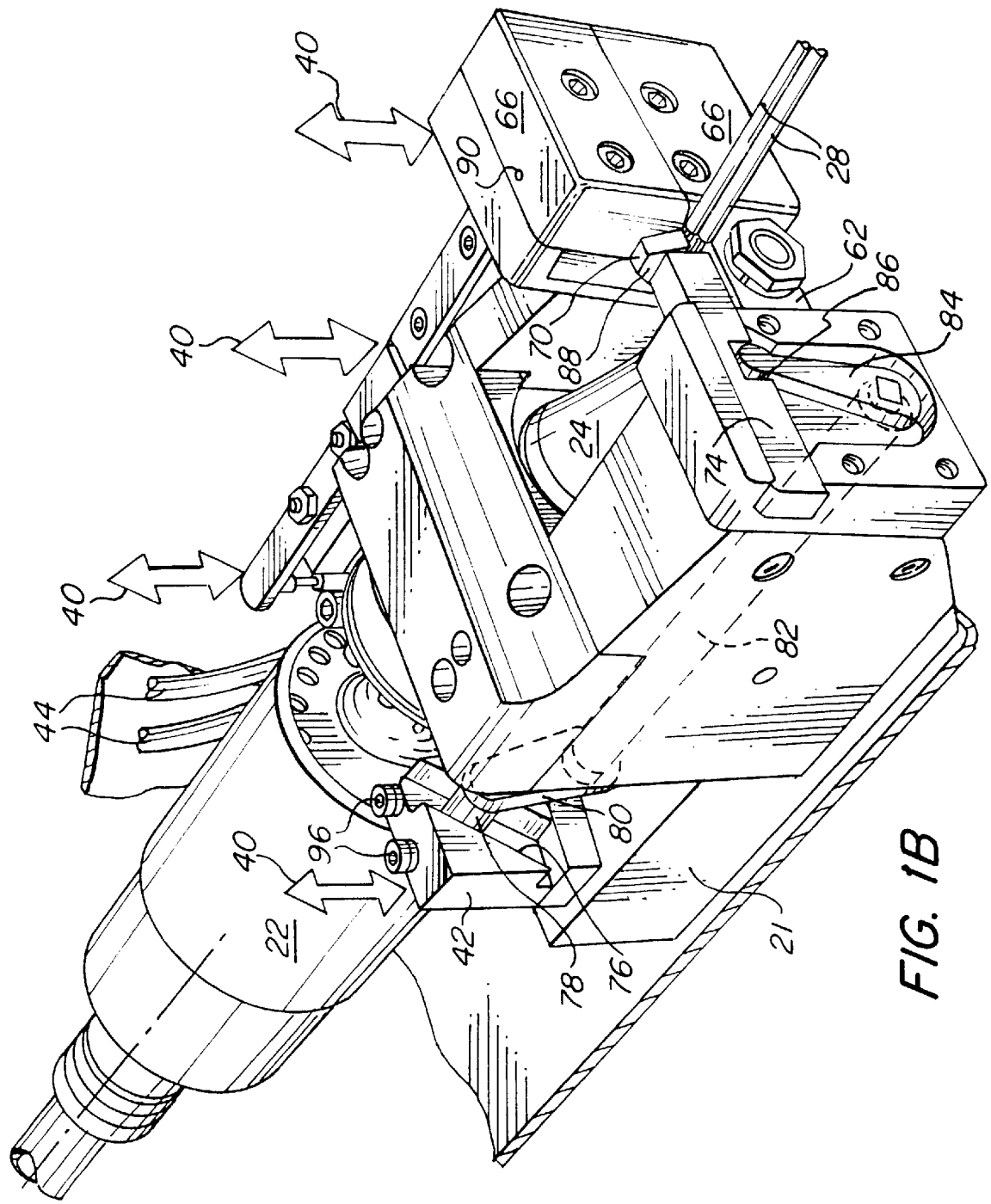
FIG. 1B is a front isometric view of an ultrasonic welder in accordance with FIG. 1A with wires inserted therein for welding.

Referring to FIGS. 1, 3–4, and 5A–5B, an ultrasonic welder 20 in accordance with the invention is depicted. Welder 20 comprises a base 21, an ultrasonic transducer 22, a horn 24, an anvil assembly 26/26' for holding articles such as wires 28 to be welded, a frame 29 movably mounted to base 21, an actuator 30 (FIGS. 3–4 and 5A–5B only) for moving frame 29 to vary a size of a weld zone 32 defined by anvil assembly 26/26', an encoder 34 for sensing a position of actuator 30 (not shown in FIG. 1), and a microprocessor (not shown in any Figure) for controlling operation of transducer 22 in response to signals generated by encoder 34.

Transducer 22 and horn 24 are mounted to base 21 and are connected together as described below with reference to FIGS. 6–7. Anvil assembly 26' is also mounted to base 21 while anvil assembly 26 is mounted to and moves with frame 29. Anvil assemblies 26\26' are described below with reference to FIGS. 5A–5B.

Figure 4:
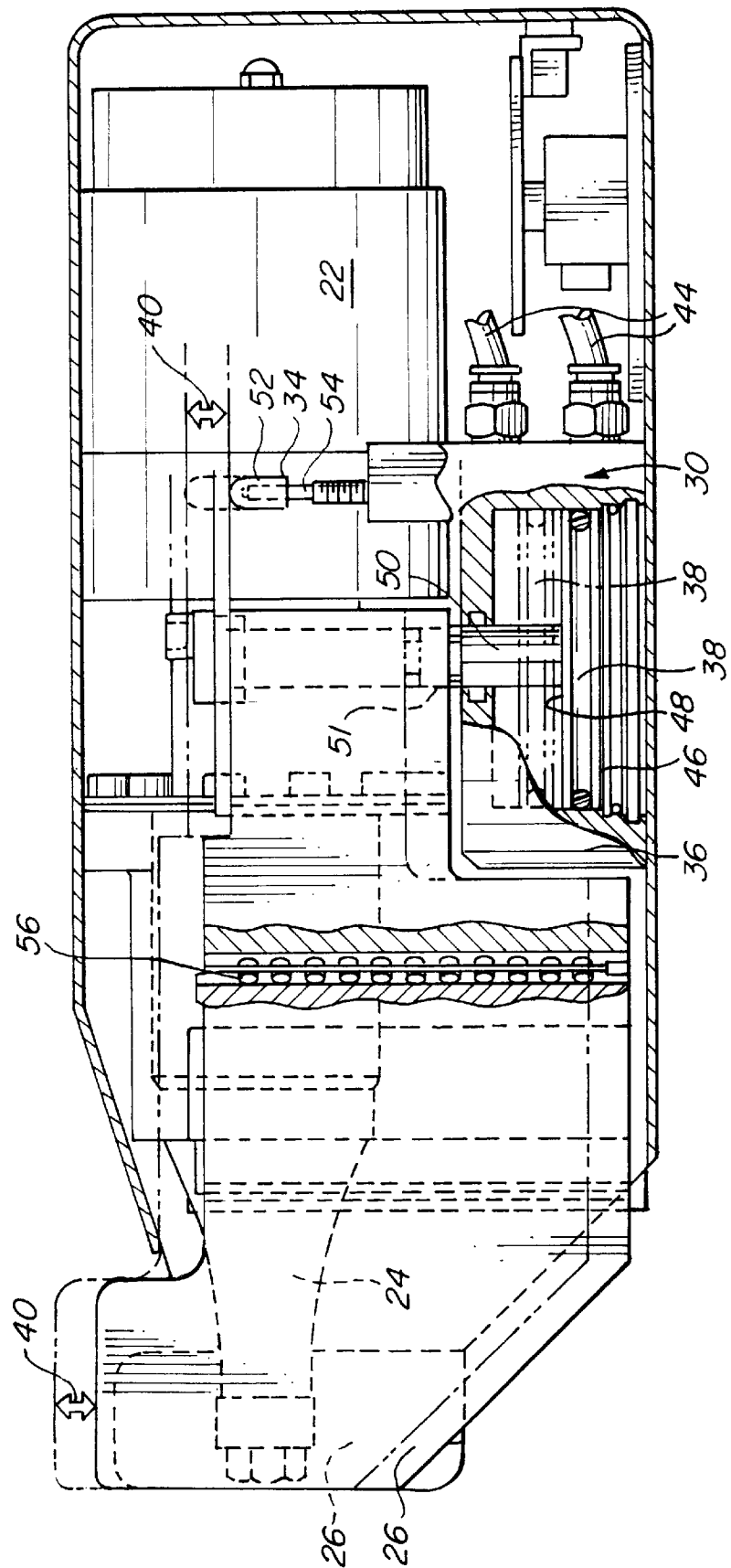
FIG. 4 is a side elevation view of the ultrasonic welder of FIG. 1A partially cut away to reveal the cylinder actuator and a frame bearing.

Referring to FIGS. 1 and 4, actuator 30 comprises a cylinder 36 and piston 38 for raising and lowering frame 29 as indicated by arrows 40 in FIGS. 1B and 4. Frame 29 interconnects anvil assembly 26, encoder 34 and a cam block 42 (see FIG. 1) for coordinated movement.

Piston 38 moves between the two positions shown in FIG. 4 by application of pressurized fluid from fluid lines 44 on opposite faces 46, 48 of piston 38. A shaft 50 and yoke 51 (see FIGS. 3 and 5A–5B) connects piston 38 to frame 29 so movement of piston 38 causes a corresponding change in position of frame 29. Cylinder 40 is preferably pneumatic but may also be hydraulic. Application of pressurized fluid to cylinder 40 is controlled by the microprocessor (not shown in any Figure) according to the program described below with reference to FIG. 8.

At any time, a position of frame 29 (which correlates directly to the position of piston 38) may be precisely determined from the state of encoder 34 which comprises a cap 52 and a wand 54. Cap 52 is mounted for movement with frame 29 while wand 54 is fixedly mounted to base 21 so that the extent to which cap 52 covers wand 54 varies with changes in position of frame 29 causing a corresponding change in a position indicating signal input to the microprocessor (not shown).

A pair of bearings 56 (see FIG. 3 also) insure that anvil assembly 26 moves substantially linearly at a distance from piston 38. Cam block 42 is connected for movement with the rest of frame 29 by yoke 51 which passes beneath transducer 20.

Changes in the position of frame 29 are carefully monitored by the microprocessor because they correspond to changes in a size of weld zone 32. Referring now to FIGS. 1A–1B, 3 and 5A–5B, the size of weld zone 32 is determined by the positions of surface 60 of tip 62 (also known as a "hammer"), surface 64 of support 66, surface 68 of anvil 70 (see FIG. 2) and surface 72 of gathering tool 74 (see FIG. 5A). Surfaces 60 and 68 (see FIGS. 1A and 2) are serrated, as is known in the art, for transmission of the longitudinal, ultrasonic vibrations which weld wires 28 to one another.

Figure 3:
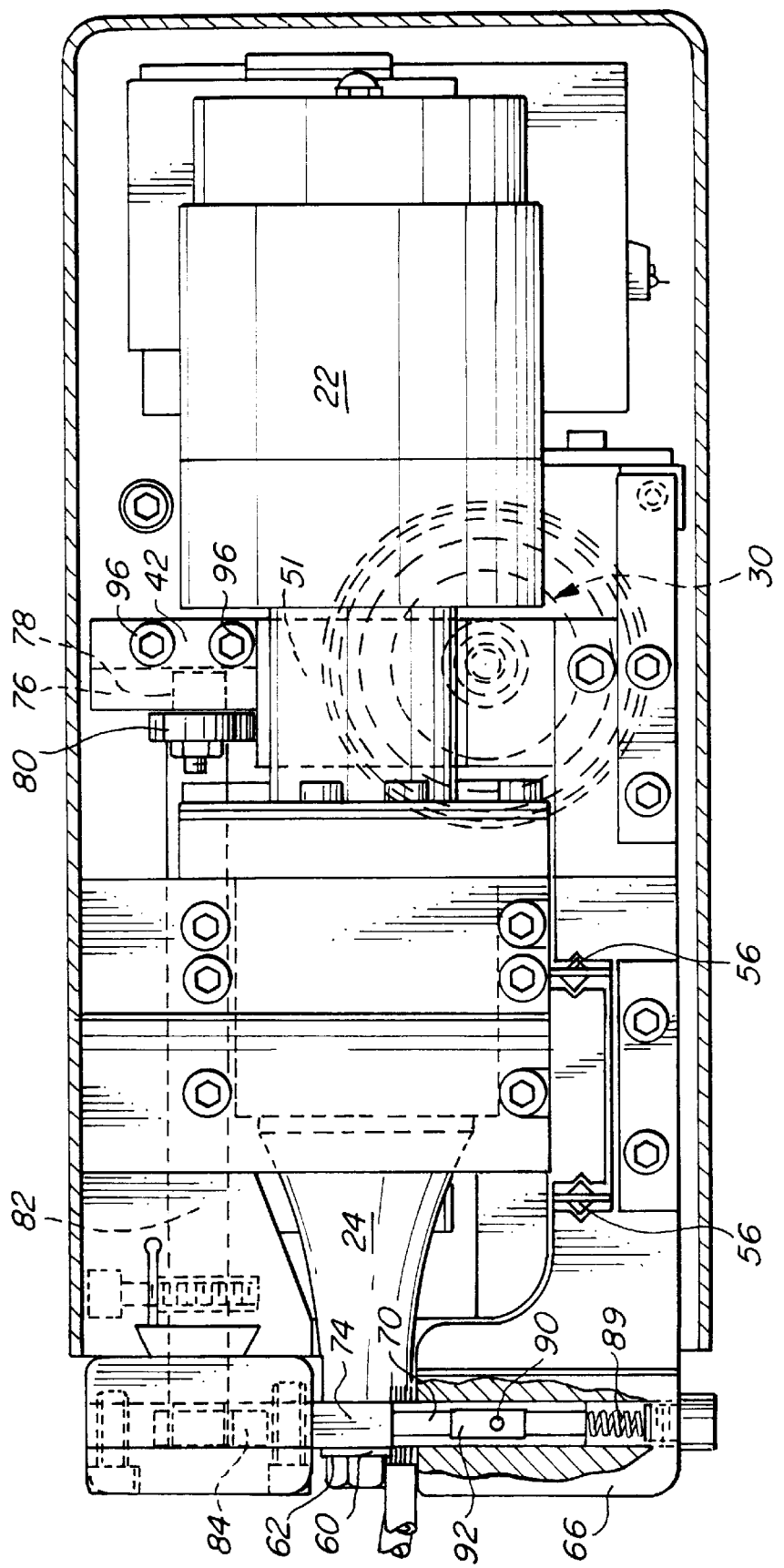
FIG. 3 is a top plan view of the ultrasonic welder of FIG. 1B partially cut away to reveal mounting of the anvil.
Figure 5B:
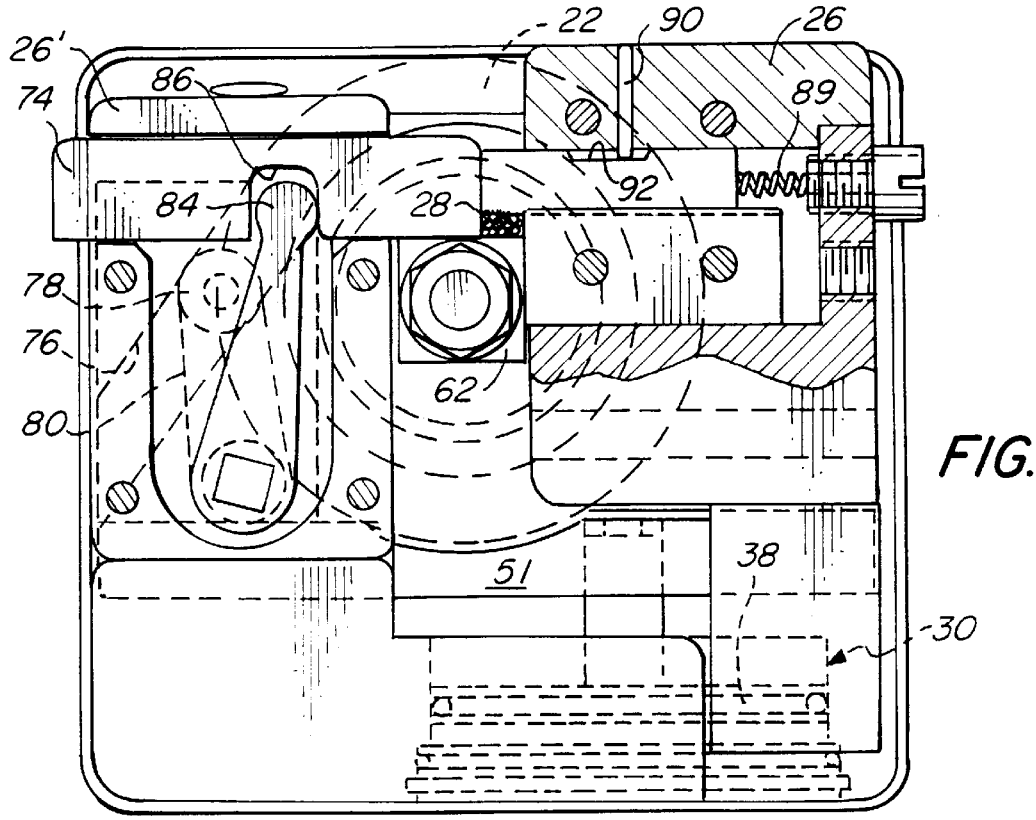
FIGS. 5A and 5B are end elevation views of the ultrasonic welder of FIGS. 1A and 1B respectively illustrating the gathering tool in the engaged and open positions.
Figure 5A:
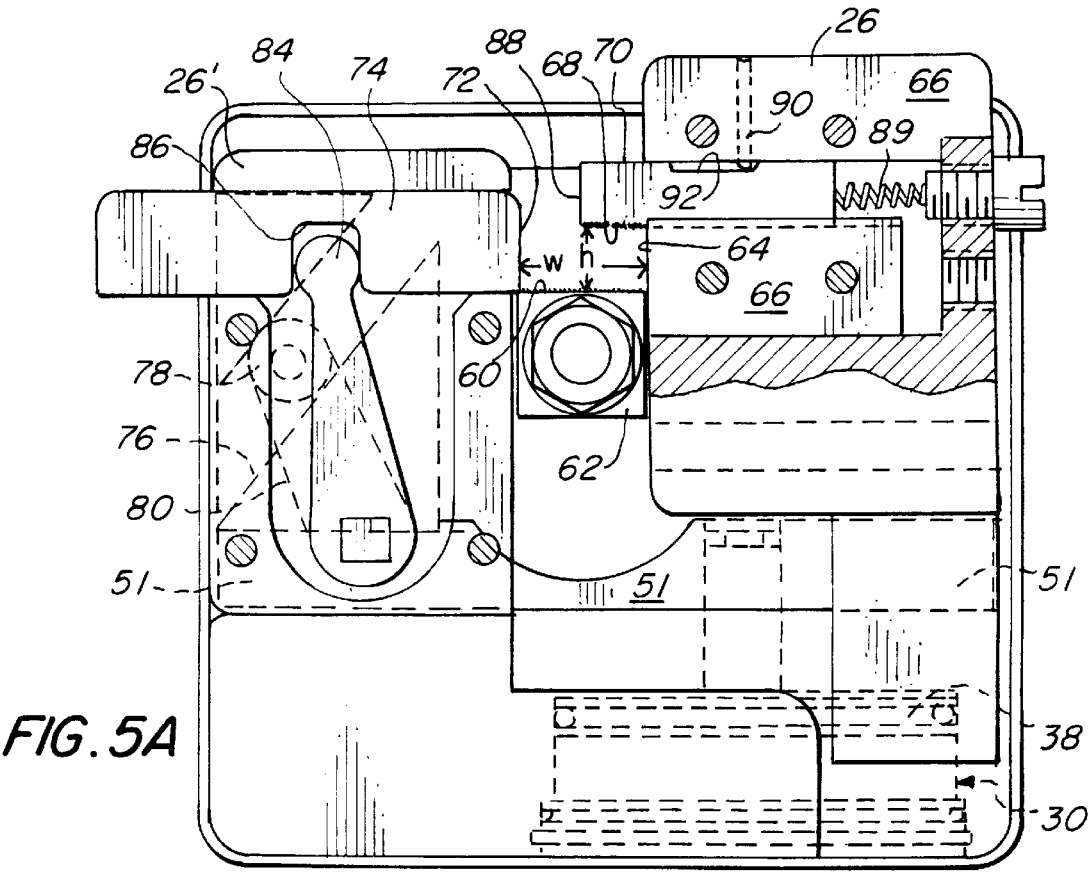

FIGS. 1A and 5A depict welder 20 with a fully open weld zone 32 awaiting input of articles to be welded, while FIGS. 1B, 3 and 5B depict welder weld zone 32 closed around wires 28. In the closed position of FIGS. 1B, 3 and 5B, anvil 70 has moved toward tip 62 and gathering tool 74 has moved toward support 66. Both of these movements are achieved a change in position of piston 38. Thus, a state of encoder 34 may be directly correlated to a size of weld zone 32.

More particularly, a position of frame 29 is directly related to a height (h) of weld zone 32 which is simply the distance between anvil surface 68 connected to the frame, and tip surface 60 which is fixedly mounted to base 21. The size of weld zone 32, which is rectangular, is its height (h) times its width (w). Weld zone width (w) is the distance between gathering tool surface 72 and support surface 64.

Weld zone width (w) can also be determined from a position of frame 29 as follows. Yoke 51 passes beneath transducer 22 to connect cam block 42 to frame 29. Cam block 42 includes a cam track 76 therein through which a cam follower 78 slides as frame 29 moves.

Cam follower 78 is rotatably mounted at one end of a crank arm 80 which converts movement of follower 78 into rotation of arm 80. At the other end of crank arm 80 is one end of a shaft 82 mounted for rotation to base 21. At the other end of shaft 82, then, is one end of a second crank arm 84 for converting rotation of shaft 82 into linear movement of gathering tool 74. The other end of second crank 84 fits within a notch 86 of gathering tool 74.

As frame 29 moves anvil 70 toward tip 62, cam block 42, second crank 84, and associated parts move gathering tool 74 toward support surface 64. In the welding position of FIGS. 1B and 5B, gathering tool 74 has contacted end surface 88 of anvil 70 and moved anvil 70 back into anvil part 26. In this regard, anvil 70 is slidably mounted within anvil part 26 and biased by spring 89 toward gathering tool 74. A rod 90 limits travel of anvil 70 to prevent both overcompression of spring 89, and accidental removal of anvil 70 from part 26. An end of rod 90 fits within a groove 92 on an upper surface of anvil 70.

Cam block 42 is adjustably mountable to yoke 51 by screws 96 which permit slight adjustment of the location of cam track 76 so that when anvil surface 68 contacts tip surface 60, gathering tool surface 72 will just contact support surface 64. This adjustability of cam block 42 permits calibration of welder 20 and insures that the proper ratio of weld zone height (h) to weld zone size of about 1.2:1 is achieved for all weld zone sizes. Further, it is understood that although cam track 76 is illustrated as linear, it may be provided as nonlinear especially if, for example, it is desired to vary the ratio of weld zone height (h) to weld zone size over a range of weld zone sizes.

Referring briefly to FIG. 2, anvil 70 includes sidewalls 94 which slope at an angle (a) of between about 15–30 degrees, and most preferably about 22 degrees. The purpose of angle (a) is to promote a "stickiness" between anvil 70 and the hole in which it fits during welding, while still permitting anvil 70 to freely slide under influence of gathering tool 74 and spring 89 when no welding is taking place. Stickiness improves weld efficiency because movement of the anvil during welding absorbs ultrasonic energy which would otherwise be transmitted to the weld. It has been found that with angles much below 15 degrees, anvils may become substantially permanently stuck within their slide holes, while with angles much above 30 degrees, anvils do not sufficiently stick to appreciably improve weld efficiency. An angle of about 22 degrees has been found to be best, but it is understood that this angle may vary depending upon the material, manufacturing tolerances, and finish of the anvil and associated slide hole.

Returning now to the calculation of weld zone size, since frame 29 moves cam block 42, a position of frame 29 corresponds to a position of gathering tool 74, and width (w) of weld zone 32 as well as its size can be determined. Weld zone size is used by welder 20 to determine the amount of transducer energy necessary to make the weld, thereby eliminating waste and improving the speed and reliability of the weld as will be described below with reference to FIG. 8.

Figure 6:
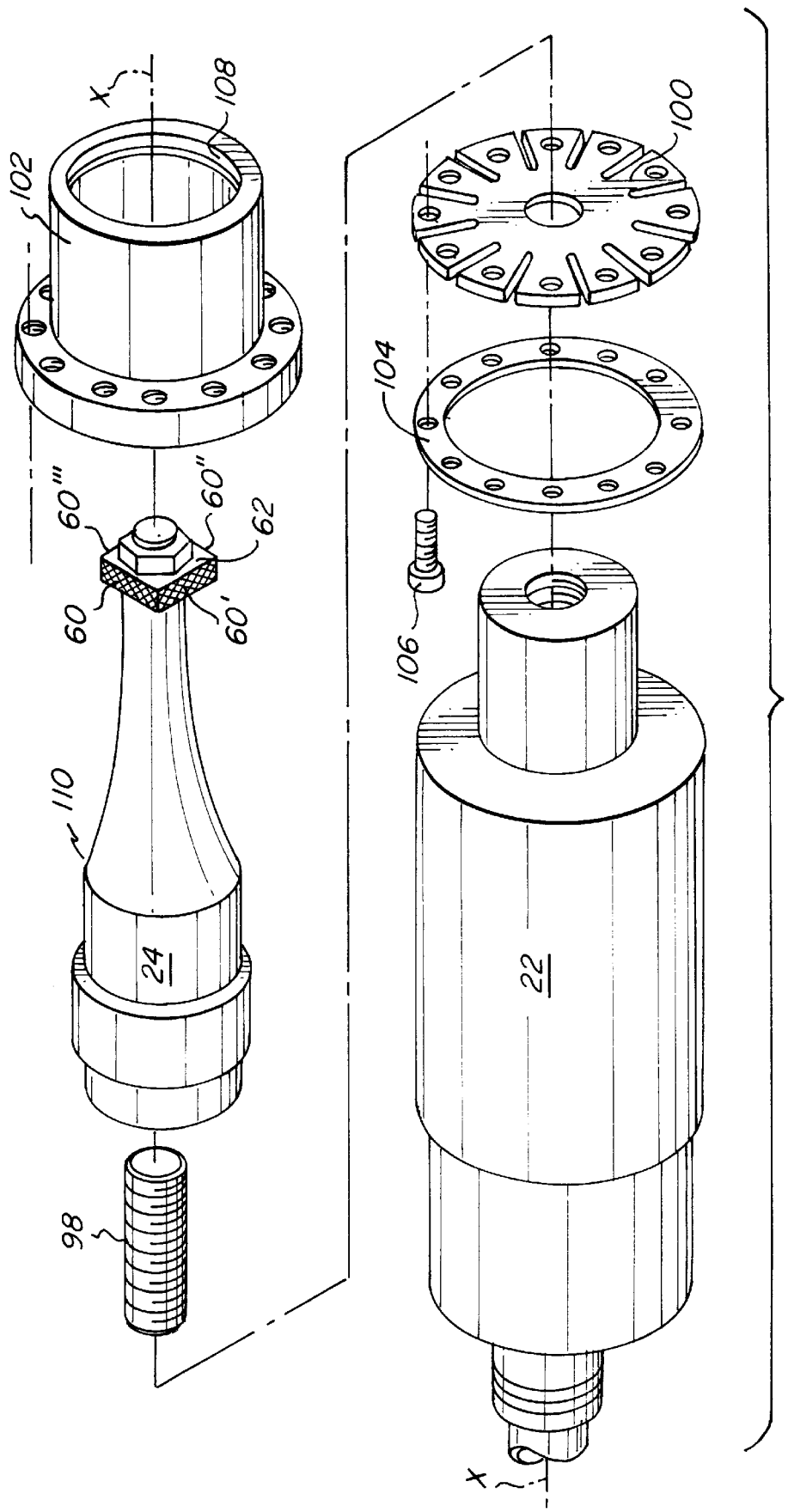
FIG. 6 is an exploded view of the transducer, horn and tip assembly used in the ultrasonic welder of FIG. 1A depicting the nodal point collar and its spring mount to the horn.
Figure 7:
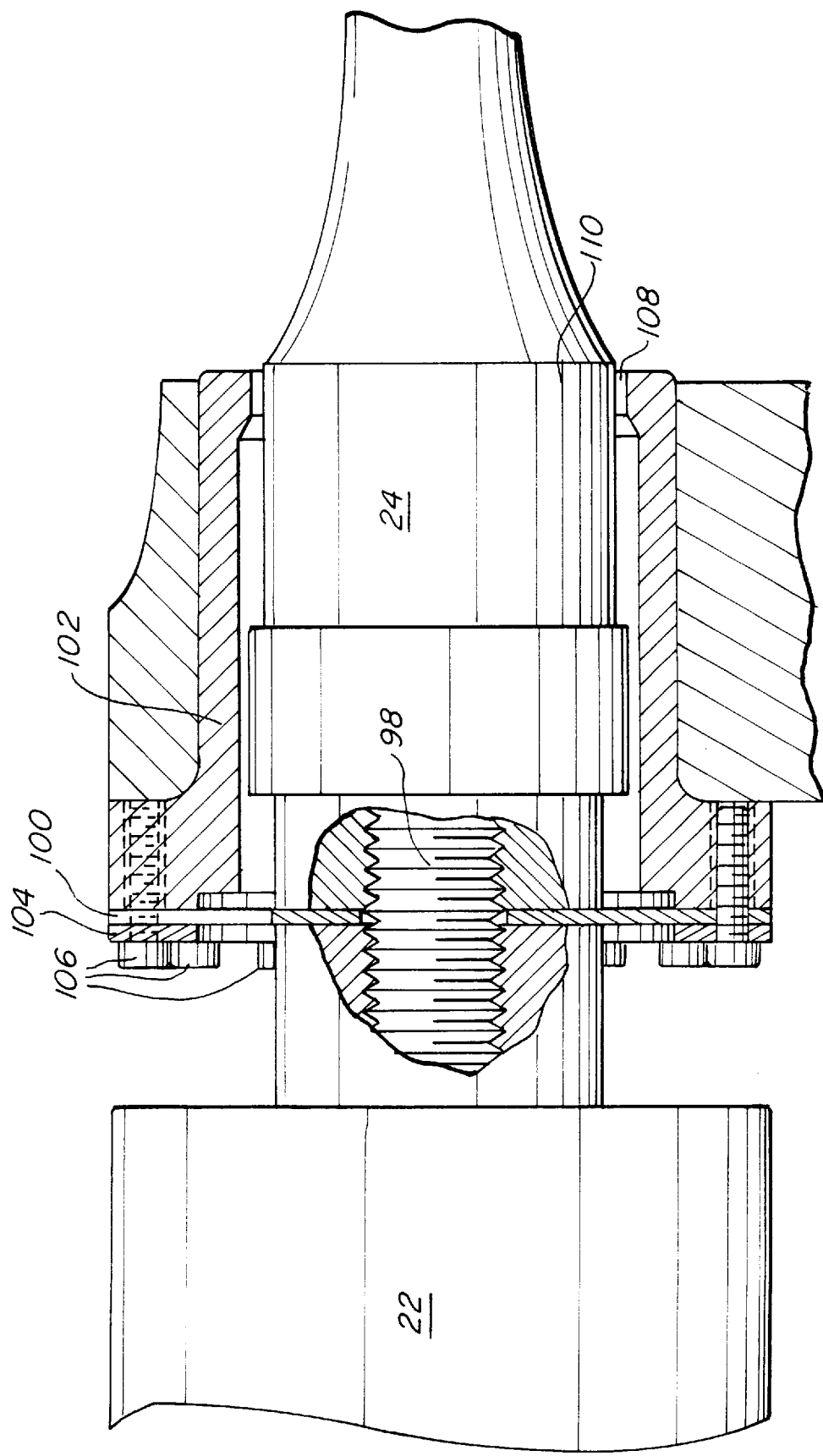
FIG. 7 is an enlarged partial cut away view of the nodal point collar of FIG. 6 mounted to the transducer and horn of the ultrasonic welder of FIG. 1A.

Another improvement to the efficiency of welder 20 comes from the means of mounting horn 24 to transducer 22 as depicted in FIGS. 6–7. In prior designs, the horn is fixed in position coaxially with the transducer by a series of circumferential set screws in an effort to permit loading of the tip without significant deflection of the horn from the transducer axis. The set screws are located at the horn's nodal point while at rest. In addition to the difficulties of accurately locating the set screws, evenly stressing the horn to avoid distortion, and maintaining the screws in position after repeated operation of the horn, the set screws, and other rigid mounting systems, absorb vibrational energy from the transducer, reducing efficiency of prior art welders.

Welder 20 overcomes these difficulties by supporting horn 24 in a completely novel manner. Horn 24 is coaxially mounted with transducer 22 along axis (x) by threaded rod 98 with a spring 100 located therebetween. Spring 100 is used to dynamically mount a collar 102 for supporting horn 24 so that when anvil 70 loads tip 62 it does not significantly deflect horn 24 from axis (x). Collar 102 is mounted to spring 100 with a ring 104 and fasteners 106 which clamp spring 100 to a periphery of collar 102. Collar 102 has an inner rim 108 which is located adjacent nodal point 110 of horn 24, not only while horn 24 is at rest, but also—due to spring 100—while horn 24 is longitudinally vibrating during welding. Rim 108 supports horn 24 at its nodal point to minimize deflection from axis (x) when tip 62 is loaded for welding, while maximizing the amount of transducer energy transmitted to weld zone 32. Because collar 102 is not rigidly mounted to, but moves with and dynamically supports horn 24 at its nodal point, collar 102 does not absorb significant amounts of transducer energy, improving the efficiency of welder 20.

As illustrated in FIG. 6, tip 62 is bolted to an end of horn 24 and includes multiple welding surfaces 60, 60', 60'', 60''' as is known in the art. Similarly, as shown in FIG. 2, anvil 70 has serrated surfaces 68 at either end thereof which may be used one after the other to reduce the need for part replacement.

Figure 8:
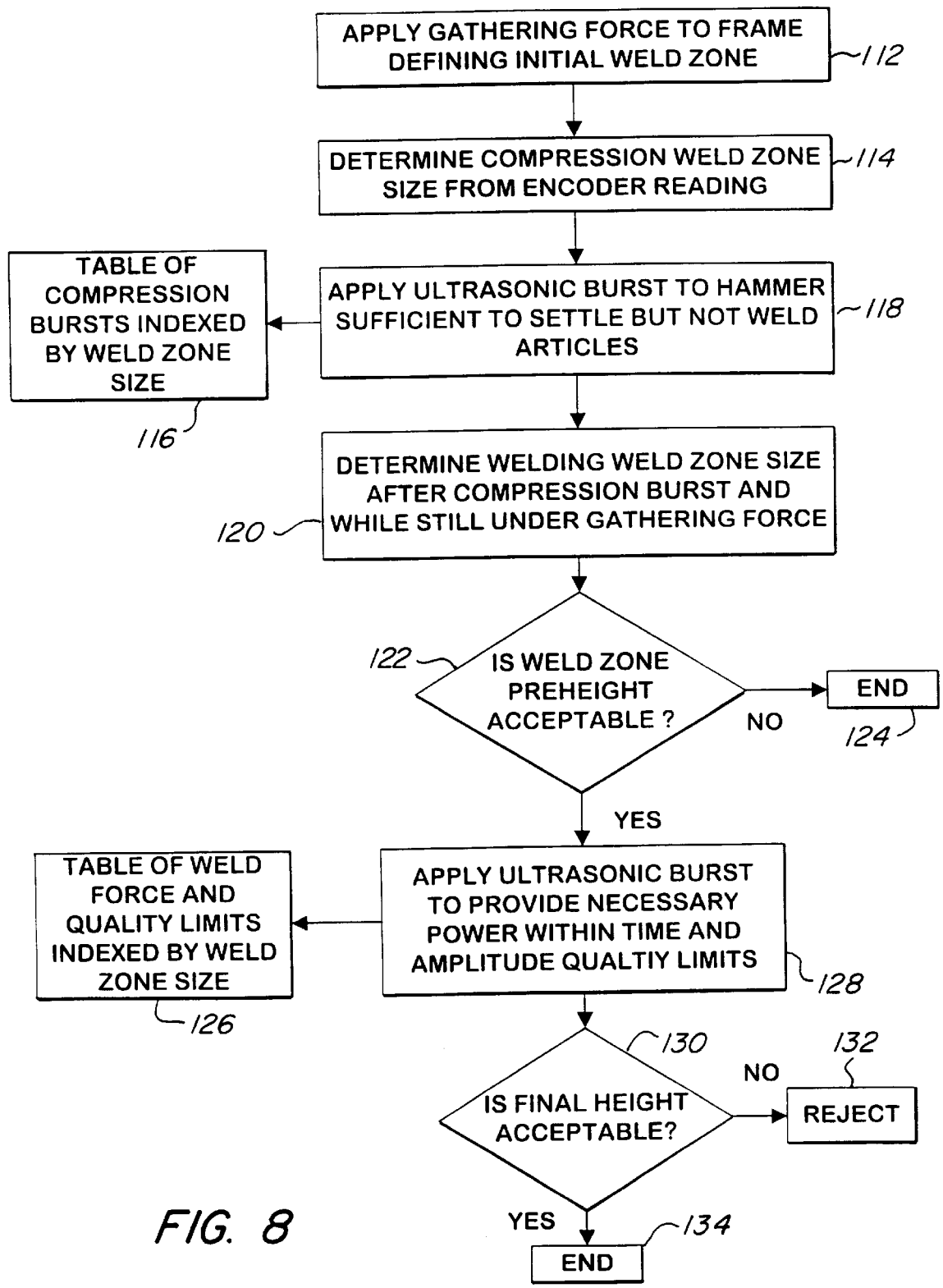
FIG. 8 is a flow diagram schematically depicting operation of the ultrasonic welder of FIG. 1A to automatically, properly weld variable size and type articles.

Referring now to FIG. 8, operation of welder 20 to automatically recognize and properly weld varying weld zone sizes and materials in accordance with the invention is schematically depicted. After wires 28 or other articles to be welded are placed within weld zone 32, a gathering force of about 25 pounds per square inch is applied to gathering tool 74 and anvil 70 to define an initial weld zone as indicated at 112. Next, at 114, an encoder 34 reading is taken and a determination is made by the microprocessor of the compression size of weld zone 32. Associated with the microprocessor is a large database of information about ultrasonic welding, including a table of ultrasonic bursts 116 indexed by weld zone size which have been found to sufficiently settle or compress articles to be welded without actually welding them together. The compression burst is applied by transducer 22 to weld zone 32 at 118.

With the gathering force still being applied to articles 28 to be welded, a second encoder reading is taken and a second microprocessor determination is made at 120 as to the welding size of weld zone 32. Also at 120, a weld zone preheight (h) is stored for later comparison to a height of the weld zone after completion of the weld. At 122, the microprocessor insures that the weld zone preheight (h) is neither too big nor too small for the weld zone size, so that a quality weld can be made. If preheight (h) does not fall within acceptable limits as determined from the database for the applicable weld size, then operation of the welder is halted at 124 and a suitable indication is made for human intervention in the welding process.

Weld zone size is used again at 126 to retrieve information about the weld force necessary for a proper weld, and quality limits on such a weld. At 128, the microprocessor controls transducer 22 to apply the necessary weld energy to weld zone 32 within the specified time and amplitude quality limits. These quality limits insure that a reliable weld is achieved with maximum efficiency and without unduly stressing the ultrasonic equipment. Another encoder reading at 130 enables determination of a height of the weld itself for comparison to the weld zone preheight as a final check on the reliability of the weld. If the weld height does not fall within an acceptable range of the preheight, for example because the articles to be welded substantially settled during welding, the weld is rejected at 132. Otherwise, the articles, having any of a variety of sizes and shapes, are efficiently and reliably welded at 134.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An ultrasonic welder comprising:
   a base;
   an ultrasonic transducer mounted to said base;
   a weld tip mounted to said base along an axis of said ultrasonic transducer;
   a gathering tool mounted to said base and slidable along a face of the weld tip;
   a frame movably mounted to said base;
   an anvil mounted to said frame and spring biased toward said gathering tool; and
   an actuator for moving said frame between a first position at which said anvil is spaced apart from both the tip and said gathering tool and a second position defining a weld zone at which said gathering tool has moved said anvil against its spring bias and at which said anvil has moved toward the tip;
   said anvil having angled sides to improve weld efficiency.

2. The ultrasonic welder of claim 1 wherein said anvil sides are angled between about 15 to 30 degrees.

3. The ultrasonic welder of claim 2 wherein said anvil sides are anbled about 22 degrees.

4. The ultrasonic welder of claim 2 wherein said actuator comprises a rod and cylinder.

5. The ultrasonic welder of claim 4 wherein said actuator further comprises a cam rotatably mounted to said base.

6. The ultrasonic welder of claim 5 wherein said actuator further comprises a cam track mounted to said movable frame.

7. The ultrasonic welder of claim 6 wherein said actuator further comprises a crank arm mounted for rotation with said cam and wherein said gathering tool includes a notch for receiving said crank arm to move said gathering tool toward and away from the anvil.

8. An ultrasonic welder comprising:

a base;

an ultrasonic transducer mounted to said base;

a weld tip mounted to said base along an axis of said ultrasonic transducer;

a gathering tool mounted to said base and slidable along a face of the weld tip;

a frame movably mounted to said base and including a slide hole;

an anvil mounted within the slide hole and having angled sidewalls to promote stickiness between the anvil and hole during welding; and an actuator for moving said frame between a first position at which said anvil is spaced apart from both the tip and said gathering tool and a second position defining a weld zone at which said anvil has moved toward said gathering tool and said tip.

9. The ultrasonic welder of claim 8 wherein the slide hole includes angled sidewalls.

10. The ultrasonic welder of claim 9 wherein said anvil is spring biased toward said gathering tool.

11. The ultrasonic welder of claim 9 wherein said anvil sides are angled between about 15 to 30 degrees.

12. The ultrasonic welder of claim 10 wherein said anvil sides are angled about 22 degrees.

13. The ultrasonic welder of claim 9 wherein said actuator comprises a rod and cylinder.

14. The ultrasonic welder of claim 12 wherein said actuator further comprises a cam rotatably mounted to said base.

15. The ultrasonic welder of claim 13 wherein said actuator further comprises a cam track mounted to said movable frame.

16. The ultrasonic welder of claim 14 wherein said actuator further comprises a crank arm mounted for rotation with said cam and wherein said gathering tool includes a notch for receiving said crank arm to move said gathering tool toward and away from the anvil.

* * * * *